(12) United States Patent
Olczak (10) Patent No.: US 9,632,005 B1
(45) Date of Patent: Apr. 25, 2017

(54) MULTI ORDER DIFFRACTIVE DEVICES

(71) Applicant: EXELIS, INC., McLean, VA (US)

(72) Inventor: Eugene Olczak, Pittsford, NY (US)

(73) Assignee: Exelis, Inc., Herndon, VA (US)

( * ) Notice: Subject to any disclaimer, the term of this patent is extended or adjusted under 35 U.S.C. 154(b) by 256 days.

(21) Appl. No.: 14/691,067

(22) Filed: Apr. 20, 2015

(51) Int. Cl.
  *G01B 9/02* (2006.01)
  *G01M 11/00* (2006.01)
  *G02B 5/18* (2006.01)

(52) U.S. Cl.
  CPC .......... *G01M 11/00* (2013.01); *G01B 9/02015* (2013.01); *G01B 9/02038* (2013.01); *G02B 5/1814* (2013.01)

(58) Field of Classification Search
  CPC .............. G01M 11/00; G01B 9/02015; G01B 9/02038; G02B 5/1814
  USPC .......................................................... 356/521
  See application file for complete search history.

(56) References Cited

U.S. PATENT DOCUMENTS

| | | | |
|---|---|---|---|
| 4,850,693 A | 7/1989 | Deason | |
| 5,548,403 A | 8/1996 | Sommargren | |
| 7,057,737 B2 * | 6/2006 | Millerd | G01J 9/02 356/495 |
| 7,561,262 B2 | 7/2009 | Napierala | |
| 8,203,789 B1 * | 6/2012 | Martinelli | G01J 3/14 356/334 |
| 8,379,222 B2 | 2/2013 | Hagino | |
| 8,526,008 B2 | 9/2013 | Cobb | |
| 8,941,837 B1 | 1/2015 | Olczak | |

FOREIGN PATENT DOCUMENTS

| EP | 1873556 | 1/2008 |
|---|---|---|

OTHER PUBLICATIONS

Hansen, "Developing Lightweight Optics for Space," Research Highlights, Transmissive Diffractive Optics, S&TR Jan./Feb. 2013, Lawrence Livermore National Laboratory, pp. 20-23.

DARPA, Tactical Technology Office, "Membrane Optic Imager Real-Time Exploitation (MOIRE)," retrieved on Jan. 28, 2015 from http://www.darpa.mil/Our_Work/TTO/Programs/Membrane_Optic_Imager_Real-Time_Exploitation_(MOIRE).aspx.

* cited by examiner

*Primary Examiner* — Hina F Ayub
(74) *Attorney, Agent, or Firm* — RatnerPrestia (57) ABSTRACT

Fizeau interferometers, in-flight metrology systems and methods of testing optical systems are described. Collimated or near collimated light is directed to interact with at least one diffractive focusing element of an optical system. The collimated or near collimated light is modified by the diffractive focusing element to form first diffracted light. The first diffracted light is directed to an image surface of the diffractive focusing element. A portion of light directed from the image surface is reflected by the diffractive focusing element back to the image surface as second diffracted light. The second diffracted light has a different diffraction order than the first diffracted light. The second diffracted light is detected to characterize the optical system.

24 Claims, 9 Drawing Sheets

MULTI ORDER DIFFRACTIVE DEVICES

TECHNICAL FIELD

Aspects of the present invention relate, in general, to interferometry. More specifically, aspects of the present invention relate to methods and systems for characterizing large optics and optical systems using different diffraction orders of light from a multi order diffractive element.

BACKGROUND

It may be desirable to characterize the optical performance of an optical element and/or an optical system. One exemplary technique for measuring optical performance includes interferometry. In this technique, a wavefront of light reflected from or transmitted by the optic under test is interfered with a wavefront of light from a reference surface, to produce an interference fringe pattern. The interference fringe pattern is analyzed to characterize the performance of the optic.

A need still exists for new and/or improved systems and methods for characterizing large optics and optical systems.

SUMMARY

One aspect of the present invention provides a method of testing an optical system including at least one diffractive focusing element. Collimated light is directed to interact with the at least one diffractive focusing element of an optical system. The collimated light is modified by the diffractive focusing element(s) to form first diffracted light. The first diffracted light is directed to an image surface of the diffractive focusing element(s). A portion of light directed from the image surface is reflected by the diffractive focusing element(s) back to the image surface as second diffracted light. The second diffracted light has a different diffraction order than the first diffracted light. The second diffracted light is detected to characterize the optical system. The portion of light directed from the image surface may emanate from a source that is independent of the collimated light in some cases.

Another aspect of the present invention is directed to a Fizeau interferometer. The Fizeau interferometer includes a light source, a diffractive lens, a mirror and a detector. The light source is configured to generate divergent light. The diffractive lens is configured to receive the divergent light from the light source and to generate first collimated diffracted light. The mirror is spaced apart from the diffractive lens and is configured to reflect the first diffracted light toward the diffractive lens. The diffractive lens is configured to direct the first divergent diffracted light reflected by the mirror to converge to an image surface of the diffractive lens. The detector is positioned proximate the image surface of the diffractive lens. The diffractive lens is configured to reflect a portion of light directed from the image surface back to the image surface as second diffracted light. The second diffracted light has a different diffraction order than the first diffracted light. The detector is configured to detect interference between the first diffracted light and the second diffracted light.

Another aspect of the present invention is directed to an in-flight metrology system. The metrology system includes at least one diffractive focusing element and a diagnostic measuring device. The diffractive focusing element(s) is configured to receive collimated light from a light source and generate first diffracted light, such that the first diffracted light is directed (diverges) to an image surface of the diffractive focusing element(s). The diffractive focusing element(s) is also configured to reflect a portion of light directed (divergent) from the image surface back to the image surface as second diffracted light (convergent), such that the second diffracted light has a different diffraction order than the first diffracted light. The diagnostic measuring device is configured to receive the second diffracted light and to characterize the metrology system based on the received second diffracted light.

It is understood that the foregoing general description and the following detailed description are exemplary, but are not restrictive, of the invention.

BRIEF DESCRIPTION OF THE DRAWINGS

The invention may be understood from the following detailed description when read in connection with the accompanying drawing. Included in the drawing are the following figures.

DETAILED DESCRIPTION

Aspects of the present invention relate to devices and methods for testing optics and optical systems, by using a multi-order property of a diffractive focusing element. An exemplary diffractive focusing element that is corrected for infinity focus of transmitted or reflected $\pm n^{th}$ diffraction order light may also be corrected for infinity focus of reflected $\pm 2n^{th}$ diffraction order light. The reflected $2n^{th}$ diffraction order light originates at the image surface, and reflects from the diffractive focusing element back to the image surface (i.e., in a different diffraction order than the transmitted/reflected $\pm n^{th}$ order light). The reflected $\pm 2n^{th}$ diffraction order light may be used by an interferometer or any other detector for system diagnostics and/or for testing an optic. Example testing systems and methods may be useful for testing large optics (e.g. greater than 1 meter clear aperture) and characterizing large diffractive imaging systems (e.g. greater than 1 meter focal length) in use. Embodiments may be generally useful for characterizing optics such as diffractive lenses or mirrors, in manufacturing optics and/or for in-use characterization or adjustment of optics (such as for adaptive optics).

In an example, aspects of the invention relate to a Fizeau cavity interferometer formed using a multi order diffractive lens. First diffracted light directed through the cavity to a detector interferes with second diffracted light at the detector. The second diffracted light has a different reflected diffraction order than the first diffracted light. Interference between the first and second diffracted light may be used to characterize the optical performance of the interferometer or an optic under test positioned in the interferometer. The interferometer may be used to ascertain optical performance as a stand-alone metrology system. The interferometer may be configured as a transmissive or reflective interferometer, such that the first diffracted light is transmitted through or reflected by the diffractive lens.

Computer generated holograms (CGHs) are known that measure optical surfaces or the wavefront of optical assemblies. Fizeau interferometers are also known for testing optical flats, transmission windows and other optics. With a conventional Fizeau interferometer, a large reference flat and large collimator optics are required when testing large optics (e.g., flats or windows). This may be expensive and complicated.

In contrast, exemplary embodiments of Fizeau cavity interferometers of the present invention use a multi order diffractive lens and a mirror spaced apart from the lens, to observe the interference between two different diffraction orders. Exemplary Fizeau cavity interferometers may provide half of the surface errors of current transmission Fizeau interferometers. An exemplary Fizeau cavity interferometer may be generally useful for testing large optics, such as large flats and windows, or for any application where a low cost Fizeau interferometer is desired.

In another exemplary embodiment, aspects of the invention relate to an in-flight metrology system including a diagnostic measuring device for testing the system. The system may include at least one diffractive element, a diffractive imaging system and the diagnostic measuring device. The system may direct first (transmitted or reflected) diffracted light to the imaging system and second diffracted light (of a different reflected diffraction order, optionally from an independent source) to the diagnostic measuring device. The second diffracted light may be used to characterize the optical performance of the metrology system. In some examples, the diagnostic measuring device may include an interferometer. The interferometer may include a diagnostic illumination source. The diagnostic measuring device may provide in-use characterization and/or adjustment of the metrology system (e.g., such as adjustment of the diffractive element(s) and/or the diffractive imaging system).

Figure 1A:
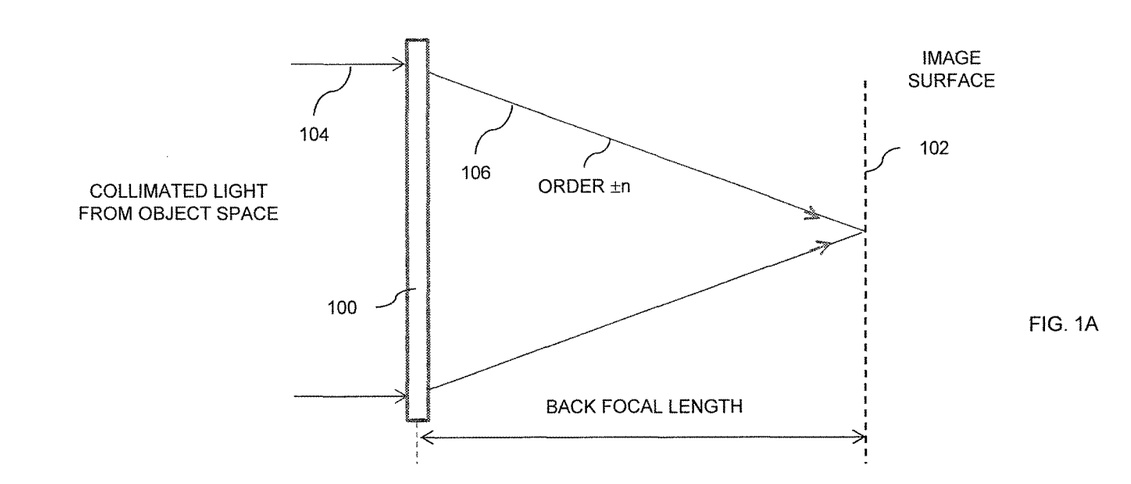
FIGS. 1A and 1B are cross section diagrams of an exemplary diffractive lens illustrating light paths of different diffraction orders directed to an image surface of the diffractive lens according to an aspect of the present invention.
Figure 1B:
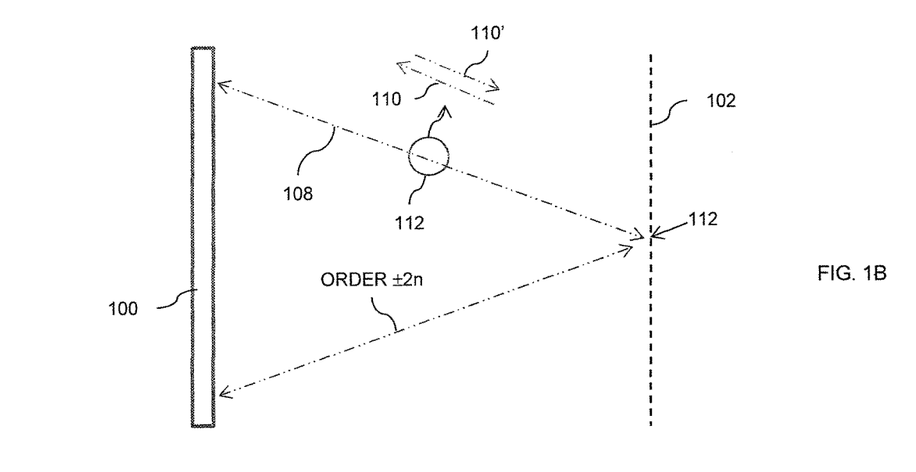

FIGS. 1A and 1B show an exemplary multi order diffractive lens 100 for testing an optic or an optical system. In particular, FIG. 1A illustrates a light path of first diffracted light 106 to image surface 102; and FIG. 1B illustrates a light path of second diffracted light 108 to image surface 102.

Multi order diffractive lens 100 may be configured to be corrected for infinity focus of $\pm n^{th}$ diffraction order light. Because of this configuration, diffractive lens 100 may also be configured to be corrected for infinity focus of $\pm 2n^{th}$ diffraction order light.

As shown in FIG. 1A, diffractive lens 100 may include a back focal length between lens 100 and image surface 102 of lens 100. Collimated light 104 from an object space may be transmitted through diffractive lens 100 to produce first diffracted light 106 having a $\pm n^{th}$ diffraction order. First diffracted light 106 may come to focus at image surface 102. First diffracted light 106 may include a very small wave error (e.g. less than or equal to 0.25 waves rms wavefront error at the operating wavelength of the diffractive lens) at a fixed wavelength.

As shown in FIG. 1B, because diffractive lens 100 is also configured for focusing of $\pm 2n^{th}$ diffraction order light, second reflected diffracted light 108 of $\pm 2n^{th}$ diffraction order also comes to focus at image surface 102. Specifically, as shown in inset 112, a portion 110 of first diffraction light 106 from image surface 102 is directed to diffractive lens 100. Reflected light 110' is reflected back from diffractive lens 100 to image surface 102 as $\pm 2n$ diffraction order light. Thus, second diffracted light 108 comes back on itself from image surface 102. In other words, image surface 102 of multi order diffraction lens 100 may become a point source of light (emanating from point 112) directed to lens 100. In an alternate embodiment, an optional independent source of illumination (not shown) may be used to create a point source (emanating from a point displaced from point 112 on image surface and, for example, slightly tilted to adjust for that displacement or configured to emanate from point 112 such as by using image splitters, as will be understood to one of skill in the art) to create the $\pm 2n^{th}$ diffraction order light.

FIGS. 1A and 1B illustrate diffractive lens 100 configured as a transmissive diffractive lens. It is understood that diffractive lens 100 may also be configured as a reflective diffractive lens (an example shown in FIG. 3B), to reflect first diffracted light 106 from lens 100 to image surface 102. It is understood that regardless of whether first diffracted light 106 is reflected from lens 100 or transmitted through lens 100, second diffracted light 108 may also be reflected back from lens 100 to image surface 102.

The diffraction orders for first diffracted light 106 and second diffracted light 108 may be negative or positive, depending on the combination of reflection or transmission through lens 100. Although the use of two diffraction orders is described herein, in general, multi order diffractive lens 100 may use two or more diffraction orders to characterize an optic and/or an optical system.

Diffractive lens 100 may be formed of any suitable material capable of transmissive or reflective diffraction of collimated light 104 to image surface 102 and additional reflected diffracted light (i.e., second diffracted light 108) to image surface 102 having a different diffraction order. In some examples, diffractive lens 100 may be made of glass. In some examples, diffractive lens may be formed of other materials such as, without being limited to, polycarbonate, zinc selenide (ZnSe) or silicon. In still other examples, lens 100 may comprise a photon sieve or membrane optics.

In an example, a shape of a diffractive surface of diffractive lens 100 may be described mathematically as a binary type 2 optic surface. Binary optics are similar to holograms and diffraction gratings in that small grooves or lines across the optical surface impart a change in phase of the wavefront passing through the surface.

Such surfaces may be modeled with an equation containing a polynomial expansion of the deviation of a spherical or conic surface from an ideal surface. A binary optic type 2 surface is similar to an extended asphere surface model (which uses the even powers of the radial coordinate to describe the aconicity of a surface), except that there are additional polynomial terms which represent the variation in phase (rather than surface height) across the optic surface. The coefficients therefore have units of radians rather than lens units. The shape of the binary optic 2 surface is identical to the even asphere surface type, with planes, spheres, conics and polynomial aspheres up to order 16 being supported. The sag of the surface is as follows:

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}. \quad (1)$$

In this equation, z is the deviation, or sag, from the vertex tangent plane, of the surface as a function of a radial coordinate r. The symbol c is the reciprocal of the base radius of curvature, k is the conic constant and $\alpha_1$ through $\alpha_8$ are fitting coefficients. The conic constant k determines the nature of the conic surface; for example, hyperbola for k<−1, parabola for k=−1, ellipse for −1<k<0, and sphere for k=0.

The binary optic 2 surface adds a phase term to the even asphere model (equation 1) according to the following polynomial expansion:

$$\Phi = M \sum_{i=1}^{N} A_i \rho^{2i} \quad (2)$$

In equation (2), N is the number of polynomial coefficients in the series, $A_i$ is the coefficient on the $2i^{th}$ power of ρ, ρ is the normalized radial aperture coordinate and M is the diffraction order.

The calculation of the binary optic surface may be carried out using known optical design software, such as ZEMAX. Various design constraints may be used in the calculation to realize desired advantages. ZEMAX, instead of modeling the wavelength-scale grooves directly, uses the phase advance or delay represented by the surface locally to change the direction of propagation of the ray. Other effects, such as scattering, efficiency or multiple order diffraction may be ignored. Binary surfaces may have zero thickness, with no index change across the surface, or may have different media on either side of the surface. In this case, the refraction due to a material change may be accounted for as well as the diffraction effects.

Results of Equations (1) and (2) may be used to fabricate diffractive lens 100 to the desired shape using known techniques in the art, such as computer-controlled grinding and polishing or single point diamond turning.

Although the above example describes the diffractive surface of diffractive lens 100 as a binary type 2 optic, diffractive lens 100 is not limited to this configuration. In other examples, the diffractive surface may be blazed. In still other examples, the lens may be a volumetric lens, a polymeric lens, or a dichromated gelatin (DCG) lens.

Figure 2:
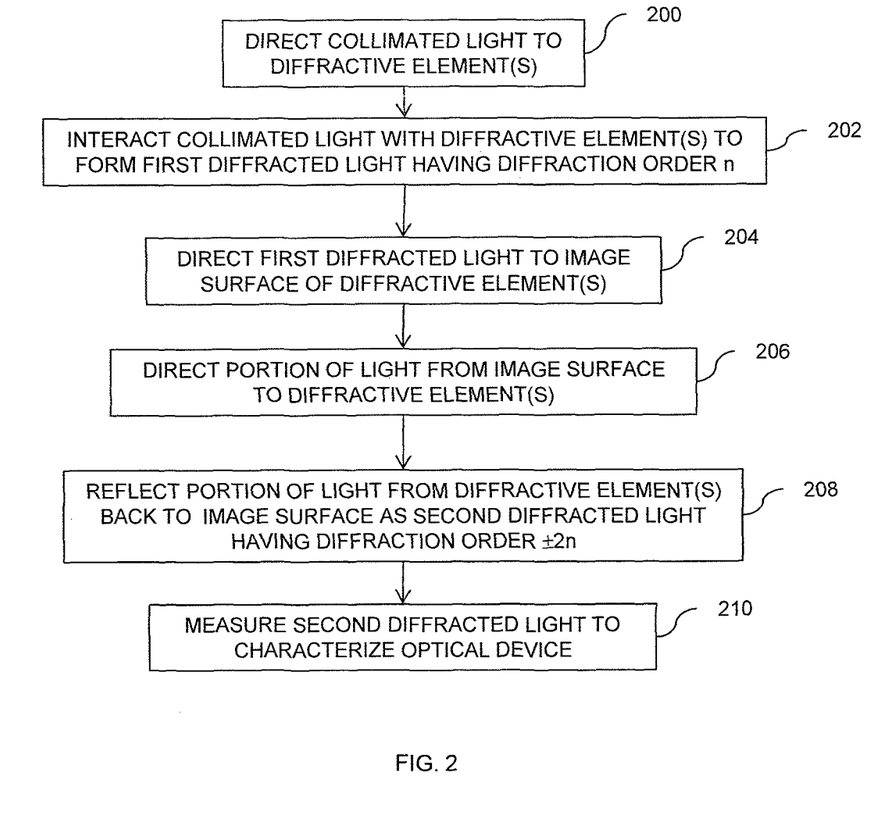
FIG. 2 is a flowchart diagram of an exemplary method of testing an optic and/or an optical system using reflected diffraction order light from a multi order diffraction element according to an aspect of the present invention.
Figure 5:
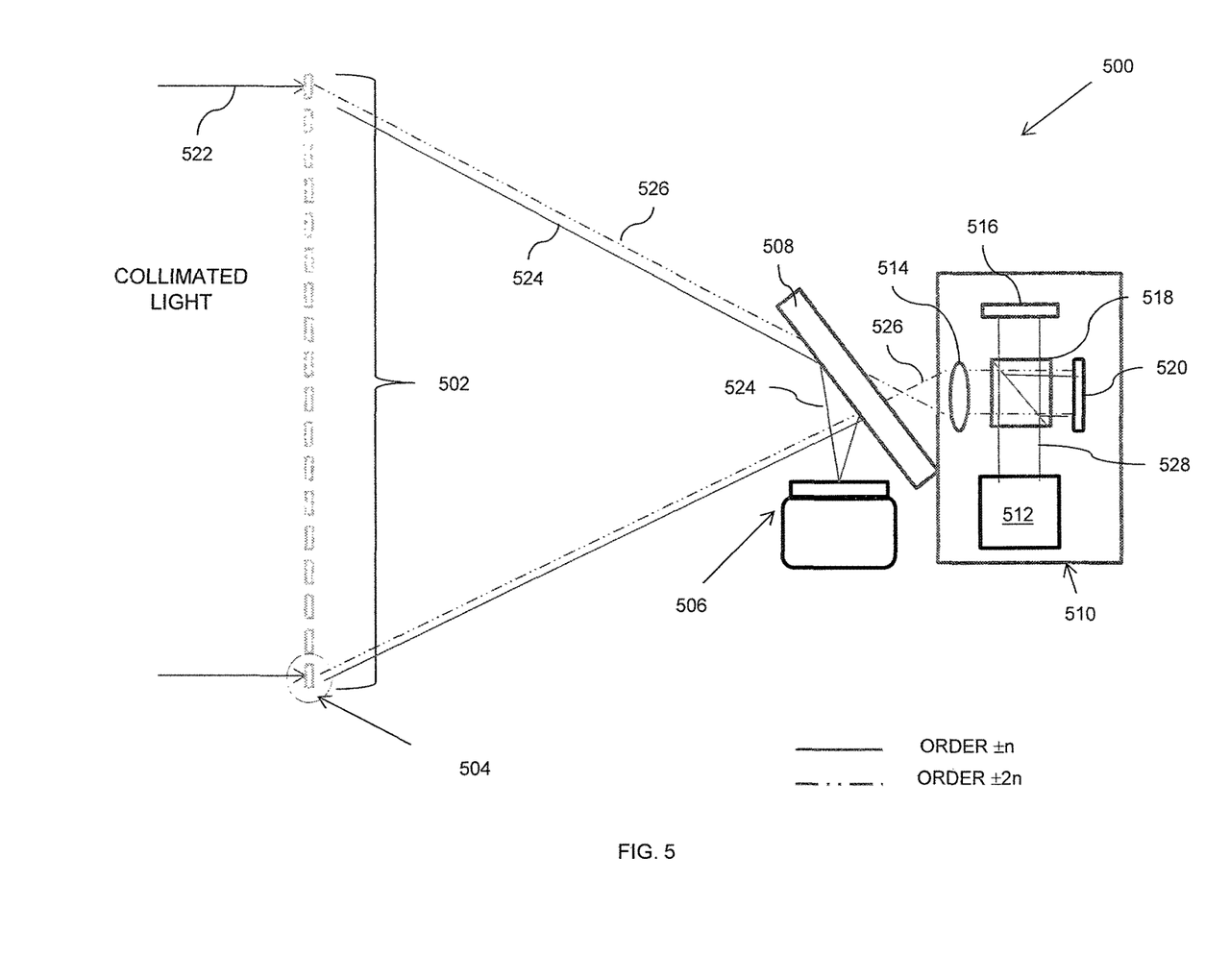
FIG. 5 is an optical schematic of an exemplary in-flight imaging system comprising an in-flight metrology system including a diagnostic measuring device according to an aspect of the present invention.

Referring to FIG. 2, a method of testing an optic and/or optical system using reflected diffraction order light is described. The method is described with reference to FIG. 1. At step 200, collimated light 104 is directed to at least one diffractive element of an optical device. For example, the diffractive element(s) may include diffractive lens 100. In some examples, diffractive lens 100 may be part of an optical system such as Fizeau cavity interferometer 300 (FIG. 3A) or Fizeau cavity interferometer 330 (FIG. 3B). In some examples, an array 502 of diffractive elements 504 may be part of an in-flight imaging system 500 (FIG. 5).

At step 202, collimated light 104 interacts with the diffractive element(s) (e.g., lens 100) to form first diffracted light 106 having diffraction order ±n. Collimated light 104 may interact with the diffractive element(s) (e.g., lens 100) such that collimated light 104 is transmitted through the diffractive element(s) (as shown in FIG. 1A) or may be reflected by the diffractive element(s) (as shown in FIG. 3B) to form first diffracted light 106. At step 204, first diffracted light 106 is directed to image surface. 102 of the diffractive element(s) (e.g., lens 100).

At step 206, a portion 11Q of light at image surface 102 is directed back to the diffractive element(s) (as shown in FIG. 1B). At step 208, responsive to step 206, second reflected light 108 (110') having diffraction order ±2n is reflected back to image surface 102.

At step 210, second diffracted light 108 (directed to image surface 102) may be measured to characterize the optical device. In some examples (described with respect to FIGS. 3A and 3B), interference between the second diffracted light and the first diffracted light may be measured to characterize the optical device (or an optic within the optical device). In some examples (described with respect to FIG. 5), the second diffracted light may be measured to characterize an in-flight metrology system.

Next, several examples of systems are described that use the reflected diffraction order of a multi order diffractive element(s) to test an optic and/or optical system.

Figure 3A:
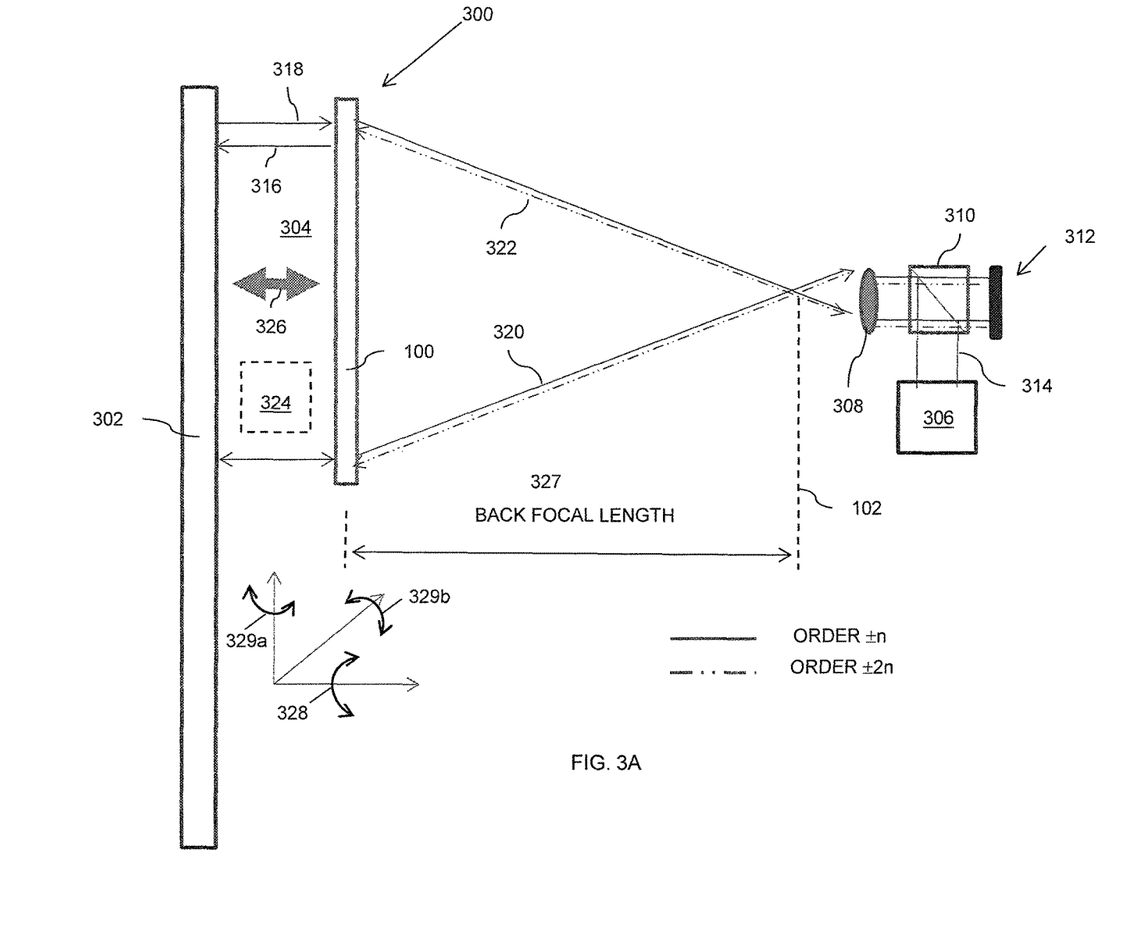
FIG. 3A is an optical schematic of an exemplary transmissive Fizeau interferometer according to an aspect of the present invention.
Figure 3B:
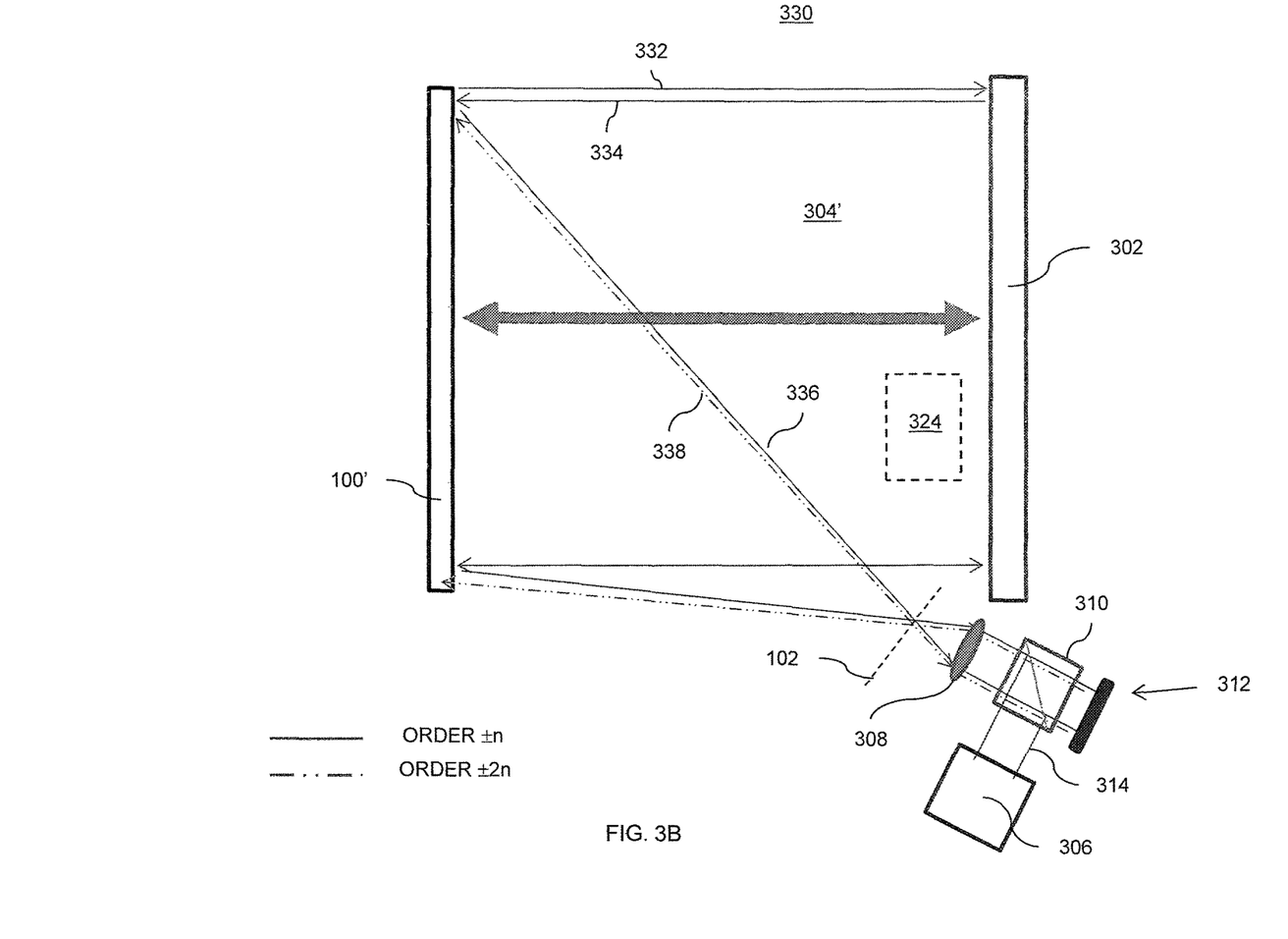
FIG. 3B is an optical schematic of an exemplary reflective Fizeau interferometer according to an aspect of the present invention.

FIG. 3A shows an exemplary embodiment of a diffractive Fizeau cavity interferometer 300 in a transmissive mode. Interferometer 300 may include diffractive lens 100 spaced apart from mirror 302 to form Fizeau cavity 304. Interferometer 300 may also include light source 306, focusing lens 308, beam splitter 310 and detector 312. Light source 306 and detector 312 may be spaced apart from lens 100 by at least the back focal length of diffractive lens 100, and may be positioned proximate image surface 102 of diffractive lens 100.

In some examples, detector 312 may be used to characterize interferometer 300. In some examples, optional optic 324 under test may be positioned in Fizeau cavity 304, and detector 312 may characterize optional optic 324.

In some examples, interferometer 300 may include an optional translation stage (not shown) to linearly translate mirror 302 relative to diffractive lens 100, illustrated via double-headed arrow 326, to provide for a scanning phase shift between test and reference beams.

In some examples, interferometer 300 may include an optional moving stage (not shown) to move mirror 302 (or optic under test 324). For example, a rotation stage may be used to rotate mirror 302 (or optic under test 324) about an axis of rotation parallel to the optic axis (parallel to axis 328 illustrated in FIG. 3A), in a clockwise or counter-clockwise direction. As shown in FIG. 3A, rotating mirror 302 about an axis parallel to the optical axis may allow detector 312 to cover an entire 360 degrees of a surface of mirror 302. Likewise, for an optic under test 324 in which the Fizeau cavity 304 covers a dimension greater than or equal to the radius of the optic 324 under test, rotating the optic under test parallel to the optic axis may allow detector 312 to cover the entire 360 degrees of the optic under test 324. Any moving stage known in the art for moving mirror 302, optional optic under test 324, or detector 312 relative to one another in a plane perpendicular to the optic plane may enable scanning portions of mirror 302 or optic under test 324. Although shown in FIG. 3A with mirror 302 extending beyond the coverage provided by diffractive element 100, both the mirror and the optic under test 324, or only the optic under test, may extend beyond the coverage provided by diffractive element 100, and any scanning methodology (rotation, translation, rastering, etc.) may be used to provide full coverage of the area of interest for characterization. In other embodiments, the optic under test 324 may be have a size that completely fits within the Fizeau cavity created by mirror 302 and diffractive element 100. In some embodiments, a stage configured to produce small rotations of mirror 302 or optic under test 324 along axes 329a, 329b, or any axis not parallel to the optic axis may be used to provide a tilt carrier for fringe modulation.

In operation, light 314 emitted from light source 306, such as a laser, is collimated and directed to diffractive lens 100 via beam splitter 310 and focusing lens 308. Collimated light 314 is transmitted through diffractive lens 100 to produce transmitted diffracted light 316 having diffraction order ±n. Transmitted diffracted light 316 is reflected from mirror 302 as reflected light 318 and transmitted again through diffractive lens 100 to form first diffracted light 320 (of order ±n). First diffracted light 320 is focused at image surface 102 (at a distance of the back focal length from diffractive lens 100). First diffracted light 320 is directed by focusing lens 308 through beam splitter 310 to detector 312.

In addition, second (reflected) diffracted light 322 is generated at image surface 102, and reflected by diffractive lens 100 back to image surface 102 (as described above in FIG. 1β). Second diffracted light 322 has a diffraction order of ±2n (i.e., a different diffraction order from first diffracted light 320). Second diffracted light 322 is also directed by focusing lens 308 through beam splitter 31Q to detector 312.

First diffracted light 320 and second diffracted light 322 interfere with each other at image surface 102 (and subsequently at detector 312). The resulting interference pattern provides a characterization of interferometer 300 (or optional optic 324 under test). Thus, interferometer 300 interferes a transmitted diffraction order (light 32Q) with a different reflected diffraction order (light 322) to ascertain the optical performance.

Light source 306 may use white light, multi-spectral light, multi-wavelength light, or broadband light. In general any portion of the electromagnetic spectrum either in part or in whole may be used to generate light 314.

Detector 312 may include a single detector or an array of detectors. Detector 312 may include any suitable light detector(s), including, without being limited to, at least one photodiode or charge coupled device (CCD). In some examples, detector 312 may include at least one camera for imaging an interference pattern.

Although not illustrated, mirror 302 or diffractive lens 100 may be wedge-shaped, to prevent secondary interference fringes from planar surfaces not selected for observation. Thus, an interior surface of mirror 302 or diffractive lens 100 may be tilted at an angle away from parallel with respect to remaining interior surface.

FIG. 3B shows an example embodiment of a diffractive Fizeau cavity interferometer 330 in a reflective mode. Interferometer 330 is similar to interferometer 300 except that interferometer 330 includes diffractive lens 100' configured to generate reflected diffracted light 332 (as opposed to transmitted diffracted light 316). The remaining components of interferometer 330 are similar to interferometer 300 described above. In some examples, interferometer 330 or detector may be disposed on one or more optional moving stages, such as a translation stage and/or rotation stage.

Because interferometer 330 is configured for reflection mode, inner surfaces of mirror 302 and diffractive lens 100' may be parallel to each other. Diffractive lens 100' and mirror 302 may form Fizeau cavity 304'. In some examples, optional optic 324 under test may be placed in cavity 304' for characterization.

In operation, light 314 emitted from light source 306 is collimated and directed to diffractive lens 100' via beam splitter 310 and focusing lens 308. Collimated light 314 is reflected by diffractive lens 100' to produce reflected diffracted light 332 having diffraction order ±n. Reflected diffracted light 332 is reflected from mirror 302 as reflected light 334 and reflected again by diffractive lens 100' to form first diffracted light 336 (of order ±n). First diffracted light 336 is focused at image surface 102 of diffractive lens 100'. First diffracted light 336 is directed by focusing lens 308 through beam splitter 310 to detector 312.

In addition, second (reflected) diffracted light 338 is generated at image surface, and reflected by diffractive lens 100' back to image surface 102 (as described above in FIG. 1B). Second diffracted light 338 has a diffraction order of ±2n (i.e., a different diffraction order from first diffracted light 336). Second diffracted light 338 is also directed by focusing lens 308 through beam splitter 310 to detector 312.

First diffracted light 336 and second diffracted light 338 interfere with each other at image surface 102 (and subsequently at detector 312). The resulting interference pattern provides a characterization of interferometer 330 (or optional optic 324 under test). Thus, interferometer 330 interferes a reflected diffraction order (light 336) with a different reflected diffraction order (light 338) to ascertain the optical performance.

Reflection mode interferometer 330 may include an advantage with respect to the surface quality of diffractive element 100' compared to a conventional transmission Fizeau interferometer. Surface errors are common mode for the first and second orders (i.e., n=1 and n=2). Thus the impact of reference surface errors for these modes are half that of a conventional transmission Fizeau interferometer.

Figure 4A:
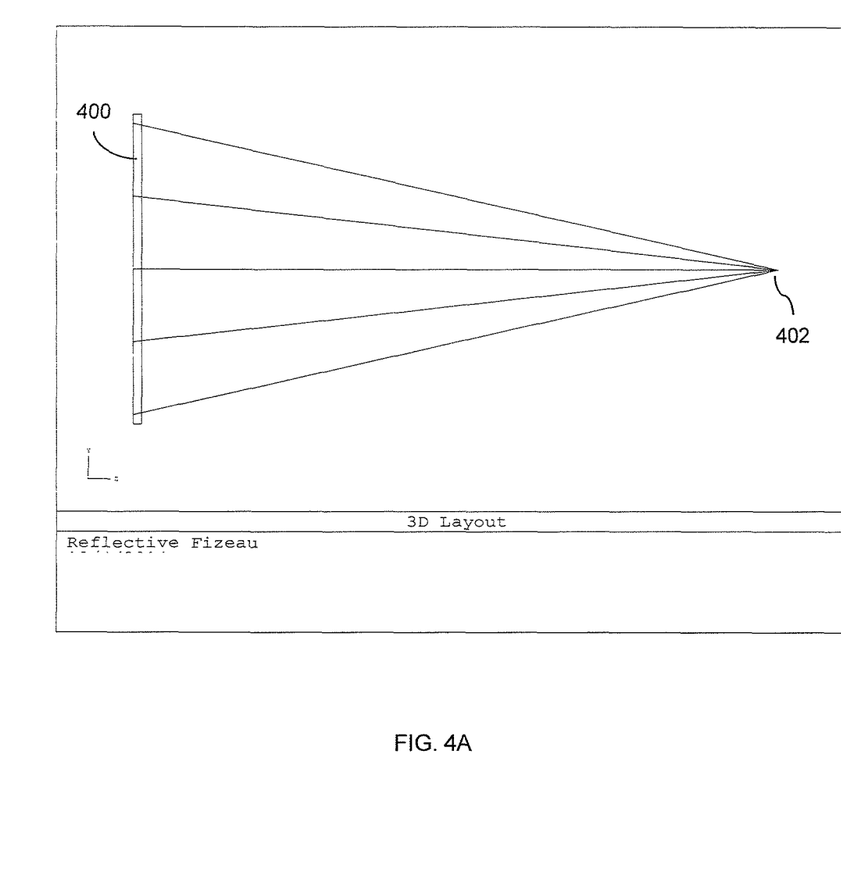
FIG. 4A is an exemplary computed diffractive lens for a reflective Fizeau interferometer as shown in FIG. 3B according to an aspect of the present invention.
Figure 4B:
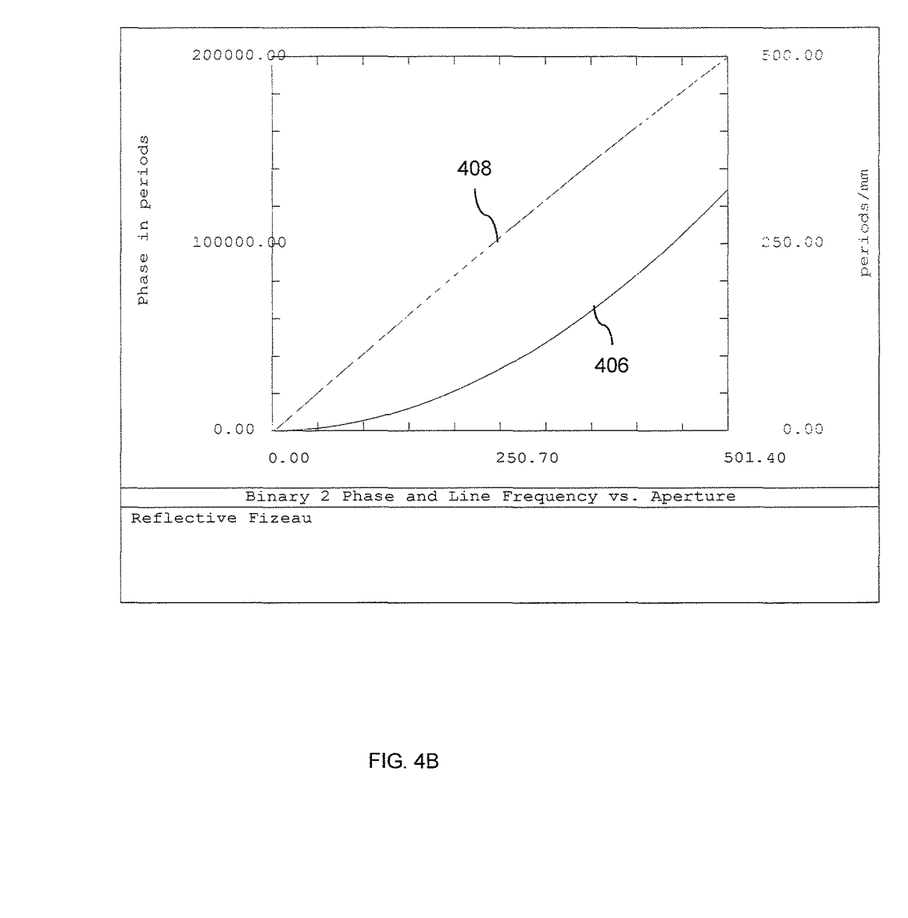
FIG. 4B is a graph of phase and line frequency as a function of aperture for the diffractive lens shown in FIG. 4A.

Referring next to FIGS. 4A and 4B, an example of a computed reflective diffractive lens modeled from a binary type 2 optic is described. In particular, FIG. 4A is an example diffractive lens 400 which may be used in a reflective Fizeau interferometer (such as interferometer 330 shown in FIG. 3B); and FIG. 4B is a graph of phase (curve 406) and line frequency (curve 408) as a function of aperture for diffractive lens 400.

FIG. 4A illustrates that light rays from diffractive lens 400 are focused at focal point 402. The light rays represent the first diffractive order (n=−1) (similar to first diffracted light 106 in FIG. 1A) and the second diffractive order (n=−2) from light at the image surface reflected by lens 400 back to focal point 402 (e.g., second diffracted light 108 in FIG. 1B).

Diffractive lens 400 is modeled from a binary type 2 optic with parameters of infinity radius, mirror type glass, 501.400 semi-diameter (in lens units) and 0.000 conic. For the first diffractive order (n=−1), the binary optic is modeled with infinity thickness. For the second diffractive order (n=−2), the binary optic is modeled with −1500.000 mm thickness.

Tables 1 and 2 below illustrates resulting wavefront errors for computer simulations of reflective diffractive lens 400, for the first diffractive order (Table 1) and the second diffractive order (Table 2). In general, FIG. 4B and Tables 1 and 2 indicate the wavefront quality of reflective diffraction lens 400 for first and second diffracted light that is focused to focal point 402.

TABLE 1

Wavefront Error for First Diffractive Order (n = −1)

| Surface | Image |
| --- | --- |
| Field | 0.0000, 0.0000 (deg) |
| Wavelength | 0.6328 µm |
| Peak to Valley (to chief) | 0.00000278 waves |
| Peak to Valley (to centroid) | 0.00000278 waves |
| RMS (to chief) | 0.00000076 waves |
| RMS (to centroid) | 0.00000076 waves |
| Variance | 0.00000000 waves squared |
| Strehl Ratio (Est.) | 1.00000000 |
| RMS fit error | 0.00000000 waves |
| Maximum fit error | 0.00000000 waves |

TABLE 2

Wavefront Error for Second Diffractive Order (n = −2)

| Surface | Image |
| --- | --- |
| Field | 0.0000, 0.0000 (deg) |
| Wavelength | 0.6328 µm |
| Peak to Valley (to chief) | 0.00000556 waves |
| Peak to Valley (to centroid) | 0.00000556 waves |
| RMS (to chief) | 0.00000153 waves |
| RMS (to centroid) | 0.00000153 waves |
| Variance | 0.00000000 waves squared |
| Strehl Ratio (Est.) | 1.00000000 |

Referring next to FIG. 5, an optical schematic of system 500 comprising a combined in-flight imaging system with an in-flight metrology system. As shown, system 500 may include diffractive array 502 having diffractive elements 504, diffractive imaging sensor 506, beam splitter 508 and diagnostic measuring device (metrology system) 510.

In operation, collimated light 522 may be transmitted through diffractive array 502 to produce first diffracted light 524 having diffraction order ±n. First diffracted light 524 may be focused to the image surface (not shown) at the back focus length of array 502. In addition, second diffracted light 526 having diffraction order ±2n is produced at the image surface and reflected back from diffractive array 502 to the image surface (as described above, in FIG. 1B).

Beam splitter 508 may be positioned proximate the image surface. Beam splitter 508 may direct first diffracted light 524 to diffractive imaging sensor 506 and second diffracted light 526 to diagnostic measuring device 510. In certain configurations, such as a configuration in which the diagnostic measuring device is in the same plane as the imaging sensor but laterally displaced, the beam splitter may be omitted.

Diffractive imaging sensor 506 may capture one or more images of an area to be imaged from first diffracted light 524 (received beam splitter 508). Diagnostic measuring device 510 may characterize system 500 (such as diffractive array 502) based on second (reflected) diffracted light 526 (received via beam splitter 508). In some examples, diagnostic measuring device 510 may provide in-use testing of system 500. In some examples, the results from diagnostic measuring device 510 may be used with adaptive optics to adjust, for example, positioning of diffraction array 502 and/or imaging sensor 506.

Diffractive array 502 may include one or more diffractive elements 504. In general, elements 504 of diffractive array 502 may form a diffractive lens having a back focal length at which an image surface is positioned (see FIG. 1A). Although diffractive array 502 is illustrated as a transmissive diffractive array, in some examples, diffractive array 502 may include a reflective diffractive array.

Diffractive imaging sensor 506 may include any sensor capable of capturing an image from first diffracted light 524. In some examples, sensor 506 may include one or more CCDs.

In an example, diagnostic measuring device 510 may include diagnostic light source 512, such as a laser, diverger 514, reference mirror 516, beam splitter 518 and detector 520. Diverger 514 may be configured to transform a collimated beam (i.e., second diffracted light 524) into a diverging (or converging) beam and direct the light toward detector 520. In some examples, diverger 514 may include an objective lens.

Reference light 528 from diagnostic light source 512 may be directed to reference mirror 516 via beam splitter 518. Reference light 528 may interfere with second diffracted light 526. The resulting interference pattern may be detected by detector 520 and used to characterize system 500. Detector 520 may be similar to detector 312 (FIG. 3A), and may include a single detector or an array of detectors configured to detect light. In some examples, detector 520 may include at least one camera for imaging an interference pattern.

Diagnostic measuring device 510 may include an interferometer (e.g., a Michelson interferometer, a Twyman-Green interferometer, etc.), wavefront sensor (e.g., a Shack-Hartmann wavefront sensor) or any other suitable optical measuring device.

Figure 7:
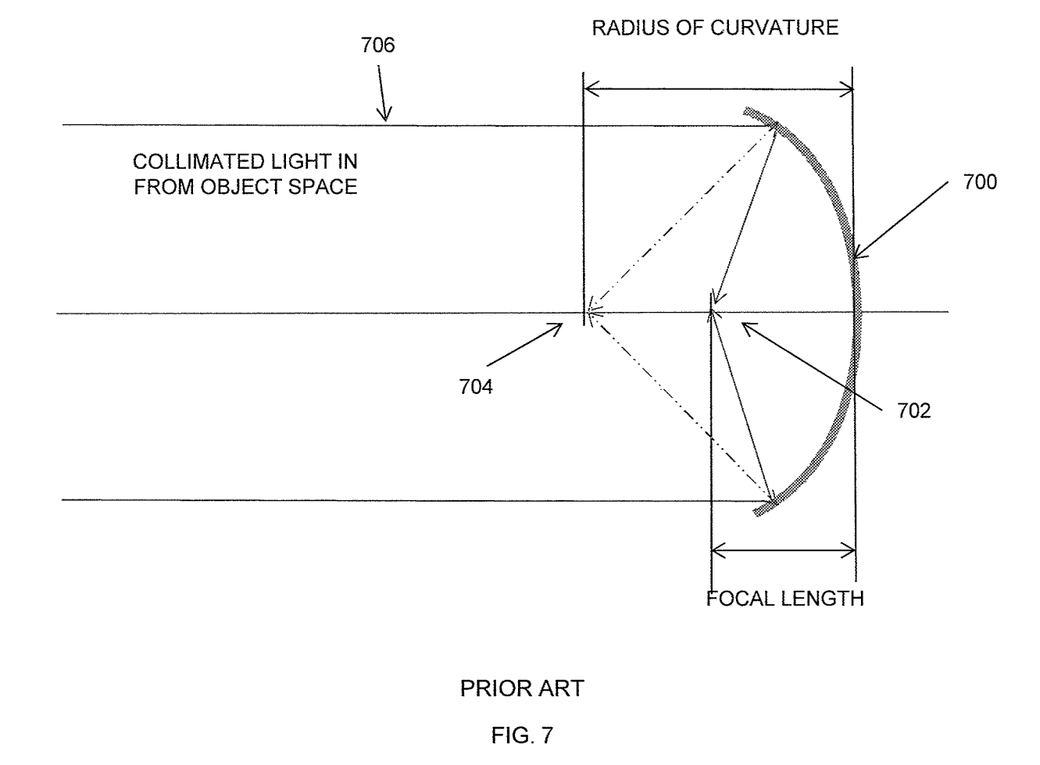
FIG. 7 is a cross section diagram of an exemplary conventional imaging parabola.

Metrology system 500 provides an advantage compared with prior art reflective optic systems. Referring to FIG. 7, a conventional parabolic mirror 700 is shown. Mirror 700 may be used, for example, in a reflective imaging metrology system, such as for a telescope primary mirror. Parabolic mirror 700 includes a focal length, and a radius of curvature that is approximately twice the focal length. Mirror 700 includes an image surface 702 that is located at the focal length. Mirror 700 also includes center of curvature 704.

With a conventional optic such as reflective parabolic mirror 700, it is not possible to observe light 706 that launches from image surface 702 back at the same image surface 702, at least not when the optic is designed to image from infinity (or otherwise far away). For parabola 700, this can be accomplished for center of curvature 704. However, the wavefront at center of curvature 704 is typically severely aberrated. Thus, center of curvature 704 may not be a convenient location and, in fact, often requires specialized nulling optics because a parabola is infinity corrected (most telescope primary mirrors are parabolic or nearly parabolic). Metrology system 500 using a diffractive element overcomes these limitations and provides an advantage for in-flight metrology, by providing an illumination source at the image surface (either from a reflected diffraction order or from an independent source) that reflects back to the image surface (to provide reflected diffracted light 526 for system characterization and/or adjustment).

Figure 6:
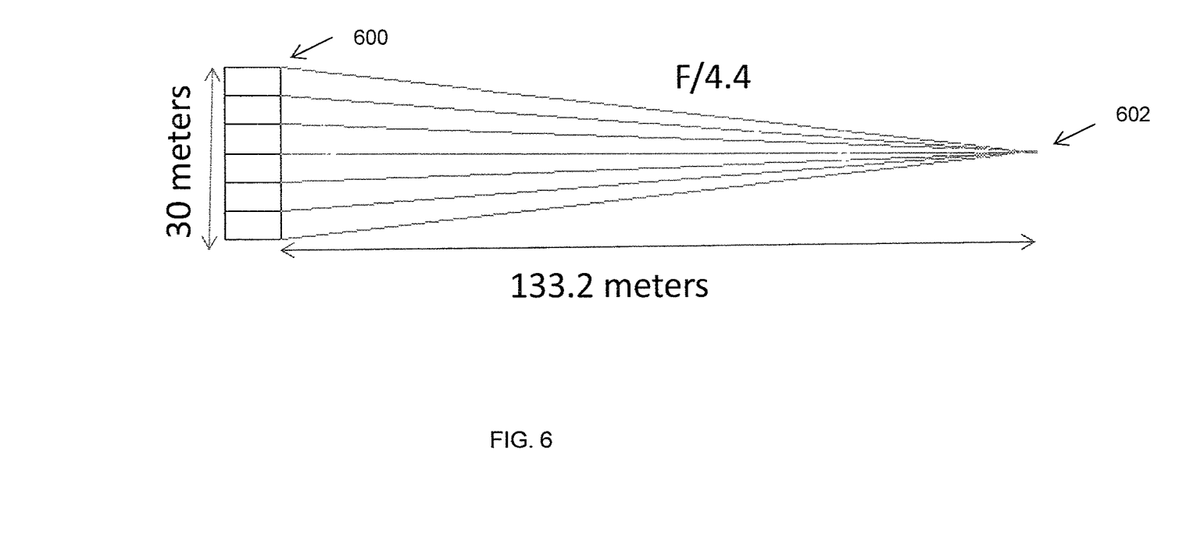
FIG. 6 is an exemplary computed array of diffractive elements that may be used in the system shown in FIG. 5 according to an aspect of the present invention.

Referring next to FIG. 6, an example of a computed transmissive diffractive lens 600 modeled from a binary type 2 optic is described. Lens 600 is 30 meters in diameter and has a back focal length of 133.2 meters to focal point 602. The light rays in FIG. 6 represent the first diffractive order (i.e., n=1) (i.e., first diffracted light 524) and the second diffractive order (i.e., n=−2) from light generated at the image surface and reflected by array 600 back to focal point 602 (i.e., second diffracted light 526). Diffractive lens 600 represents an example of array 502 (FIG. 5).

Transmissive diffractive lens 600 is modeled from a binary type 2 optic with parameters of infinity radius, mirror type glass, $1.50\times10^4$ semi-diameter (in lens units) and 0.000 conic. For the first diffractive order (n=1), the binary optic is modeled with infinity object distance. For the second diffractive order (n=−2), the binary, optic is modeled with $-1.332\times10^5$ mm object distance.

Tables 3 and 4 below illustrates resulting wavefront errors for computer simulations of transmissive diffractive lens 600, for the first diffractive order (Table 3) and the second diffractive order (Table 4). In general, Tables 3 and 4 indicate the wavefront quality of very large transmissive diffraction lens 600 for first and second diffracted light that are focused to focal point 602. The model illustrates that diffraction limited performance is possible in a very large hologram for first and second diffraction orders.

TABLE 3

Wavefront Error for First Diffractive Order (n = 1)

| Surface | Image |
|---|---|
| Field | 0.0000 (deg) |
| Wavelength | 0.6328 µm |
| Peak to Valley (to chief) | 0.00049853 waves |
| Peak to Valley (to centroid) | 0.00049853 waves |
| RMS (to chief) | 0.00006265 waves |
| RMS (to centroid) | 0.00006265 waves |
| Variance | 0.00000000 waves squared |
| Strehl Ratio (Est.) | 0.99999985 |
| RMS fit error | 0.00006264 waves |
| Maximum fit error | 0.00035040 waves |

TABLE 4

Wavefront Error for Second Diffractive Order (n = −2)

| Surface | Image |
|---|---|
| Field | 0.0000 (deg) |
| Wavelength | 0.6328 µm |
| Peak to Valley (to chief) | 0.00099712 waves |
| Peak to Valley (to centroid) | 0.00099712 waves |
| RMS (to chief) | 0.00012530 waves |
| RMS (to centroid) | 0.00012530 waves |
| Variance | 0.00000002 waves squared |
| Strehl Ratio (Est.) | 0.99999938 |
| RMS fit error | 0.00012529 waves |
| Maximum fit error | 0.00070083 waves |

The performance analysis information of examples of the invention provided herein is from optical design software and simulation, output using the ZEMAX Optical Design program. It is understood that other optical design programs may be similarly used for performance analysis.

Although discussed above with respect to "collimated light" in many of the examples herein, it should be understood that the invention is also applicable for use in connection with light that is not diffracted and not from infinity, including light that can be characterized as "nearly collimated" light originating from "near infinity" or otherwise sufficiently far away, such as, for example, from a distance of 25× the focal length of the system.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A Fizeau interferometer comprising:
   a light source configured to generate light;
   a diffractive lens configured to receive the light from the light source and to generate first diffracted light;
   a mirror, spaced apart from the diffractive lens, the mirror configured to reflect the first diffracted light toward the diffractive lens, the diffractive lens configured to direct the first diffracted light reflected by the mirror to an image surface of the diffractive lens; and
   a detector positioned proximate the image surface of the diffractive lens,
   wherein the diffractive lens is configured to reflect a portion of light directed from the image surface back to the image surface as second diffracted light, the second diffracted light having a different diffraction order than the first diffracted light, and
   the detector is configured to detect interference between the first diffracted light and the second diffracted light.

2. The Fizeau interferometer of claim 1 wherein the first diffracted light has an nth diffraction order and the second diffracted light has a 2nth diffraction order, where n is a positive or negative integer.

3. The Fizeau interferometer of claim 1 wherein the diffractive lens includes a transmissive diffractive lens.

4. The Fizeau interferometer of claim 1 wherein the diffractive lens includes a reflective diffractive lens.

5. The Fizeau interferometer of claim 1 further comprising:
   an optic under test positioned in a cavity formed between the diffractive lens and the mirror.

6. The Fizeau interferometer of claim 5 wherein the detector is configured to characterize at least one of the Fizeau interferometer or the optic under test based on the interference between the first diffracted light and the second diffracted light.

7. The Fizeau interferometer of claim 5, further comprising
   at least one moving stage configured to move at least one of the mirror, the diffractive lens, the detector, or the optic under test.

8. The Fizeau interferometer of claim 1 wherein the detector includes at least one camera configured to detect an interference pattern between the first diffracted light and the second diffracted light.

9. The Fizeau interferometer of claim 1, further comprising
   at least one moving stage configured to move at least one of the mirror, the diffractive lens, or the detector.

10. An in-flight metrology system comprising:
    at least one diffractive focusing element configured to:
      receive collimated or near collimated light from a first light source and generate first diffracted light, the first diffracted light directed to an image surface of the at least one diffractive focusing element, and
      reflect a portion of light directed from the image surface back to the image surface as second diffracted light, the second diffracted light having a different diffraction order than the first diffracted light; and
    a diagnostic measuring device configured to receive the second diffracted light and to characterize the metrology system based on the received second diffracted light.

11. The system of claim 10 wherein:
    the metrology system is configured to adjust at least one component of the metrology system based on the characterization by the diagnostic measuring device.

12. The system of claim 10 wherein
the diagnostic measuring device includes at least one of an interferometer or a wavefront sensor.

13. The system of claim 10, wherein
the at least one diffractive focusing element includes a transmissive element or a reflective element.

14. The system of claim 10 wherein
the first diffracted light has an nth diffraction order and the second diffracted light has a 2nth diffraction order, where n is a positive or negative integer.

15. The system of claim 10 further comprising
a second light source positioned at the image surface for generating the portion of light directed from the image surface back to the image surface as second diffracted light.

16. An imaging system, comprising:
the in-flight metrology system of claim 10, and
an imaging sensor configured to receive the first diffracted light and generate at least one image of an area imaged by the metrology system.

17. The imaging system of claim 16 further comprising:
a beam splitter positioned proximate the image surface of the at least one diffractive focusing element, the beam splitter configured to direct the first diffracted light to the imaging sensor and direct the second diffracted light to the diagnostic measuring device.

18. The imaging system of claim 16, wherein the at least one diffractive focusing element comprises an array of diffractive focusing elements.

19. The imaging system of claim 18, wherein the array is a transmissive diffractive array.

20. The imaging system of claim 18, wherein the array is a reflective diffractive array.

21. A method of testing an optical system including at least one diffractive focusing element, the method comprising the steps of:
directing light to interact with the at least one diffractive focusing element;
modifying the light by the at least one diffractive focusing element to form first diffracted light;
directing the first diffracted light to an image surface of the at least one diffractive focusing element;
reflecting, by the at least one diffractive focusing element, a portion of light directed from the image surface back to the image surface as second diffracted light, the second diffracted light having a different diffraction order than the first diffracted light; and
detecting the second diffracted light to characterize the optical system.

22. The method of claim 21 the method further including:
prior to directing the first diffracted light to the image surface, reflecting the first diffracted light back towards the at least one diffractive focusing element by a mirror spaced apart from the at least one diffractive focusing element, such that the first diffracted light reflected by the mirror is directed by the at least one diffractive focusing element to the image surface of the at least one diffractive focusing element,
wherein the detecting of the second diffracted light includes interfering the first diffracted light with the second diffracted light to characterize the optical system.

23. The method of claim 21 the method further including:
directing the first diffracted light to an imaging sensor configured to generate at least one image of an area to be imaged via the at least one diffractive focusing element; and
adjusting at least one of the imaging sensor or the at least one diffractive focusing element based on the characterization of the optical system via the detected second diffracted light.

24. The method of claim 21 wherein
the first diffracted light has an nth diffraction order and the second diffracted light has a 2nth diffraction order, where n is a positive or negative integer.

* * * * *